US012742233B2

(12) United States Patent
Okada et al.

(10) Patent No.: US 12,742,233 B2
(45) Date of Patent: Sep. 22, 2026

(54) DUPLEX STAINLESS STEEL PIPE

(71) Applicant: NIPPON STEEL CORPORATION, Tokyo (JP)

(72) Inventors: Seiya Okada, Tokyo (JP); Yuji Arai, Tokyo (JP); Daisuke Matsuo, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 379 days.

(21) Appl. No.: 18/691,204

(22) PCT Filed: Sep. 29, 2022

(86) PCT No.: PCT/JP2022/036483
§ 371 (c)(1),
(2) Date: Mar. 12, 2024

(87) PCT Pub. No.: WO2023/054599
PCT Pub. Date: Apr. 6, 2023

(65) Prior Publication Data

US 2025/0137110 A1 May 1, 2025

(30) Foreign Application Priority Data

Oct. 1, 2021 (JP) ................................ 2021-162901

(51) Int. Cl.
*C22C 38/44* (2006.01)
*C22C 38/00* (2006.01)
(Continued)

(52) U.S. Cl.
CPC ............ *C22C 38/60* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01);
(Continued)

(58) Field of Classification Search
CPC ... C21D 8/10; C21D 9/04; C21D 9/14; C21D 2211/001; C21D 2211/005; C22C 38/42; C22C 38/44; C22C 38/58
See application file for complete search history.

(56) References Cited

U.S. PATENT DOCUMENTS 5,298,093 A 3/1994 Okamoto
2005/0211344 A1* 9/2005 Omura .................... C22C 33/04
420/61

FOREIGN PATENT DOCUMENTS

CN 104152818 A * 11/2014
JP 05132741 A 5/1993
(Continued)

*Primary Examiner* — Vanessa T. Luk
(74) *Attorney, Agent, or Firm* — Greer Burns & Crain Ltd.

(57) ABSTRACT

The duplex stainless steel pipe according to the present disclosure consists of, by mass %, C: 0.030% or less, Si: 1.00% or less, Mn: 0.10 to 7.00%, P: 0.040% or less, S: 0.0050% or less, Cr: 20.0 to 30.0%, Ni: 4.2 to 10.0%, Mo: 0.5 to 5.0%, Cu: 0.5 to 6.0%, N: less than 0.350%, O: 0.0005 to 0.0100%, and Ca: 0.0005 to 0.0100%, with the balance being Fe and impurities. A microstructure consists of, in volume ratio, ferrite in an amount of 30 to 80% with the balance being austenite. A yield strength is 552 MPa or more. A number density of Ca oxides having an equivalent circular diameter of 2.0 μm or more is 500/100 $mm^2$ or more.

4 Claims, 1 Drawing Sheet

(51) Int. Cl.

| | |
|---|---|
| ***C22C 38/02*** | (2006.01) |
| ***C22C 38/04*** | (2006.01) |
| ***C22C 38/06*** | (2006.01) |
| ***C22C 38/42*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/54*** | (2006.01) |
| ***C22C 38/58*** | (2006.01) |
| ***C22C 38/60*** | (2006.01) |
| ***F16L 9/02*** | (2006.01) |

(52) U.S. Cl.

CPC .............. *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *F16L 9/02* (2013.01)

(56) References Cited

FOREIGN PATENT DOCUMENTS

| | | | |
|---|---|---|---|
| JP | 09195003 | A | 7/1997 |
| JP | 2014043616 | A | 3/2014 |

* cited by examiner

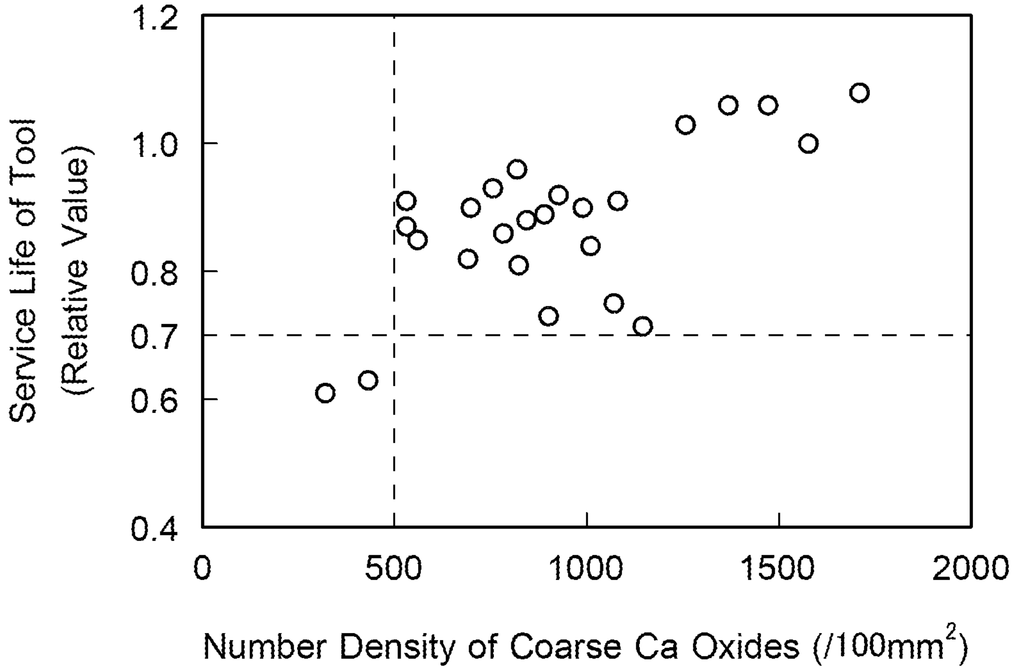
1.2
1.0
0.8
0.7
0.6
0.4
0
500
1000
1500
2000
Service Life of Tool
(Relative Value)
Number Density of Coarse Ca Oxides (/100mm$^2$)

DUPLEX STAINLESS STEEL PIPE

TECHNICAL FIELD

The present disclosure relates to a duplex stainless steel material, and more particularly relates to a duplex stainless steel pipe.

BACKGROUND ART

Oil wells or gas wells (hereinafter, oil wells and gas wells are collectively referred to simply as "oil wells") are corrosive environments containing a corrosive gas such as hydrogen sulfide gas ($H_2S$) or carbon dioxide gas ($CO_2$). It is already known that chromium (Cr) is effective for improving the corrosion resistance of a steel material in such a corrosive environment. Therefore, a duplex stainless steel material in which the content of Cr is made high is sometimes used for oil wells that are corrosive environments.

In recent years, furthermore, deep wells below sea level are being actively developed. There is thus a need to enhance a strength of duplex stainless steel materials. Japanese Patent Application Publication No. 5-132741 (Patent Literature 1), Japanese Patent Application Publication No. 9-195003 (Patent Literature 2), and Japanese Patent Application Publication No. 2014-043616 (Patent Literature 3) each propose a duplex stainless steel material that has a high strength.

The steel material disclosed in Patent Literature 1 is duplex stainless steel which has a chemical composition consisting of, in weight %, C: 0.03% or less, Si: 1.0% or less, Mn: 1.5% or less, P: 0.040% or less, S: 0.008% or less, sol. Al: 0.040% or less, Ni: 5.0 to 9.0%, Cr: 23.0 to 27.0%, Mo: 2.0 to 4.0%, W: more than 1.5 to 5.0%, and N: 0.24 to 0.32%, with the balance being Fe and unavoidable impurities. In addition, in this duplex stainless steel, PREW (=Cr+3.3(Mo+0.5W)+16N) is 40 or more. Patent Literature 1 discloses that this duplex stainless steel exhibits excellent corrosion resistance and a high strength.

The steel material disclosed in Patent Literature 2 is duplex stainless steel which has a chemical composition consisting of, in weight %, C: 0.12% or less, Si: 1% or less, Mn: 2% or less, Ni: 3 to 12%, Cr: 20 to 35%, Mo: 0.5 to 10%, W: more than 3 to 8%, Co: 0.01 to 2%, Cu: 0.1 to 5%, and N: 0.05 to 0.5%, with the balance being Fe and unavoidable impurities. Patent Literature 2 discloses that this duplex stainless steel has further excellent corrosion resistance, without lowering a strength.

The steel material disclosed in Patent Literature 3 is duplex stainless steel which has a chemical composition consisting of, in mass %, C: 0.03% or less, Si: 0.3% or less, Mn: 3.0% or less, P: 0.040% or less, S: 0.008% or less, Cu: 0.2 to 2.0%, Ni: 5.0 to 6.5%, Cr: 23.0 to 27.0%, Mo: 2.5 to 3.5%, W: 1.5 to 4.0%, N: 0.24 to 0.40%, and Al: 0.03% or less, with the balance being Fe and impurities. In addition, in this duplex stainless steel, a σ phase susceptibility index X (=2.2Si+0.5Cu+2.0Ni+Cr+4.2Mo+0.2W) is 52.0 or less, a strength index Y (=Cr+1.5Mo+10N+3.5W) is 40.5 or more, and a pitting resistance equivalent PREW (=Cr+3.3(Mo+0.5W)+16N) is 40 or more. In a microstructure of this duplex stainless steel, in a cross section in a thickness direction that is parallel to a rolling direction, when a straight line is drawn to be parallel to the thickness direction from an outer layer to a depth of 1 mm, the number of boundaries between a ferrite phase and an austenite phase which intersect with the straight line is 160 or more. Patent Literature 3 discloses that a strength of this duplex stainless steel can be increased without loss of corrosion resistance, and that by combining use of cold working with a high reduction rate, this duplex stainless steel exhibits excellent hydrogen embrittlement resistance characteristics.

CITATION LIST

Patent Literature

Patent Literature 1: Japanese Patent Application Publication No. 5-132741
Patent Literature 2: Japanese Patent Application Publication No. 9-195003
Patent Literature 3: Japanese Patent Application Publication No. 2014-043616

SUMMARY OF INVENTION

Technical Problem

In this connection, in some cases a duplex stainless steel pipe for which use as an oil-well steel pipe is assumed is subjected to cutting work. For example, a duplex stainless steel pipe is sometimes subjected to cutting work to adjust dimensions of the steel pipe. In addition, for example, a duplex stainless steel pipe is sometimes subjected to cutting work to form a threaded connection for connecting steel pipes together at a leading end of the steel pipe. Therefore, it is preferable for a duplex stainless steel pipe to not only have a high strength but to also be excellent in machinability. However, in the aforementioned Patent Literatures 1 to 3, no consideration is given to compatibly achieving both a high strength and machinability in a duplex stainless steel pipe.

An objective of the present disclosure is to provide a duplex stainless steel pipe which has a high yield strength and has excellent machinability.

Solution to Problem

A duplex stainless steel pipe according to the present disclosure consists of, by mass %, C: 0.030% or less,
Si: 1.00% or less,
Mn: 0.10 to 7.00%,
P: 0.040% or less,
S: 0.0050% or less,
Cr: 20.0 to 30.0%,
Ni: 4.2 to 10.0%,
Mo: 0.5 to 5.0%,
Cu: 0.5 to 6.0%,
N: less than 0.350%,
O: 0.0005 to 0.0100%,
Ca: 0.0005 to 0.0100%,
V: 0 to 0.200%,
Nb: 0 to 0.100%,
Al: 0 to 0.100%,
Ta: 0 to 0.100%,
Ti: 0 to 0.100%,
Zr: 0 to 0.100%,
Hf: 0 to 0.100%,
W: 0 to 0.200%,
Co: 0 to 0.500%,
Sn: 0 to 0.100%,
Sb: 0 to 0.100%,
B: 0 to 0.100%,
Mg: 0 to 0.1000%, and rare earth metal: 0 to 0.100%, with the balance being Fe and impurities, wherein:

a microstructure consists of, in volume ratio, ferrite in an amount of 30 to 80% with the balance being austenite, a yield strength is 552 MPa or more, and a number density of Ca oxides having an equivalent circular diameter of 2.0 μm or more is 500/100 $mm^2$ or more.

Advantageous Effect of Invention

The duplex stainless steel pipe according to the present disclosure has a high yield strength and has excellent machinability.

BRIEF DESCRIPTION OF DRAWING

FIG. 1 is a graph illustrating a relation between a number density (/100 $mm^2$) of Ca oxides having an equivalent circular diameter of 2.0 μm or more (coarse Ca oxides), and service life of a tool (relative value) that is an index of machinability of a steel material in a present Examples.

DESCRIPTION OF EMBODIMENT

First, the present inventors conducted studies from the viewpoint of a chemical composition with respect to a duplex stainless steel pipe in which both a high yield strength and excellent machinability can be compatibly obtained. As a result, the present inventors considered that if a duplex stainless steel pipe has a chemical composition consisting of, by mass %, C: 0.030% or less, Si: 1.00% or less, Mn: 0.10 to 7.00%, P: 0.040% or less, S: 0.0050% or less, Cr: 20.0 to 30.0%, Ni: 4.2 to 10.0%, Mo: 0.5 to 5.0%, Cu: 0.5 to 6.0%, N: less than 0.350%, O: 0.0005 to 0.0100%, Ca: 0.0005 to 0.0100%, V: 0 to 0.200%, Nb: 0 to 0.100%, Al: 0 to 0.100%, Ta: 0 to 0.100%, Ti: 0 to 0.100%, Zr: 0 to 0.100%, Hf: 0 to 0.100%, W: 0 to 0.200%, Co: 0 to 0.500%, Sn: 0 to 0.100%, Sb: 0 to 0.100%, B: 0 to 0.100%, Mg: 0 to 0.1000%, and rare earth metal: 0 to 0.100%, with the balance being Fe and impurities, there is a possibility that both a high yield strength of 552 MPa or more and excellent machinability can be compatibly obtained.

Here, a microstructure of the duplex stainless steel pipe having the aforementioned chemical composition consists of ferrite and austenite. Specifically, the microstructure of the duplex stainless steel pipe having the aforementioned chemical composition consists of, in volume ratio, ferrite in an amount of 30 to 80% with the balance being austenite. In the present description, the phrase "consist of ferrite and austenite" means that an amount of any phase other than ferrite and austenite is negligibly small.

Next, the present inventors conducted detailed studies regarding means for compatibly obtaining both a high yield strength and excellent machinability with respect to a duplex stainless steel pipe having the aforementioned chemical composition and the aforementioned microstructure. There is a tendency for the machinability of a steel material to be liable to decrease if the strength of the steel material is increased. In other words, there is a risk that the machinability of the duplex stainless steel pipe having the aforementioned chemical composition and microstructure will decrease as a result of increasing the yield strength to 552 MPa or more. Note that, in the present description, the phrase "the machinability of the steel material is high" means that a cutting tool that processes the steel material is less likely to wear. That is, when the machinability of a steel pipe decreases, a cutting tool used during cutting work will easily wear, and service life of the tool will decrease. In such a case, a frequency for replacing the cutting tool used for the cutting work will increase, and the productivity will decrease. Therefore, the present inventors investigated various means for increasing the machinability of the duplex stainless steel pipe having the aforementioned chemical composition and the aforementioned microstructure, while maintaining the yield strength of the duplex stainless steel pipe at 552 MPa or more.

The present inventors found that if a large number of Ca oxides which are mainly composed of calcium (Ca) and oxygen (O) can be formed in the duplex stainless steel pipe having the aforementioned chemical composition and the aforementioned microstructure, the machinability can be enhanced while maintaining a high yield strength of 552 MPa or more. Here, in the present description the term "Ca oxides" is defined as those particles in which the content of O is 50% by mass or more when the total content of oxygen (O), nitrogen (N), and sulfur (S) among the elements contained in the respective particles is taken as 100% by mass, and in which the content of Ca is 50% by mass or more when the total content of elements excluding O, N, and S among the elements contained in the respective particles is taken as 100% by mass.

Based on the above finding, the present inventors conducted detailed studies regarding a size and a number density of Ca oxides that, in the duplex stainless steel pipe having the aforementioned chemical composition and the aforementioned microstructure, can enhance the machinability while maintaining a high yield strength of 552 MPa or more. As a result, it was revealed by the detailed studies of the present inventors that in the duplex stainless steel pipe having the aforementioned chemical composition and microstructure, if the number density of Ca oxides having an equivalent circular diameter of 2.0 μm or more is 500/100 $mm^2$ or more, both a yield strength of 552 MPa or more and excellent machinability can be compatibly obtained. This point will be described specifically using the drawing.

FIG. 1 is a graph illustrating a relation between the number density (/100 $mm^2$) of Ca oxides having an equivalent circular diameter of 2.0 μm or more (coarse Ca oxides), and service life of a tool (relative value) that is an index of the machinability of the steel material in the present Examples. FIG. 1 was created using, among Examples to be described later, the number density (/100 $mm^2$) of coarse Ca oxides and the service life of a tool (relative value) that is an index of the machinability of the steel material, with respect to the duplex stainless steel pipes having the aforementioned chemical composition, having the microstructure consisting of, in volume ratio, ferrite in an amount of 30 to 80% with the balance being austenite, and having a yield strength of 552 MPa or more. Note that the number density of coarse Ca oxides and the service life of a tool were each determined by methods to be described later.

Referring to FIG. 1, it was revealed that in the duplex stainless steel pipe having the aforementioned chemical composition, the aforementioned microstructure, and a yield strength of 552 MPa or more, if the number density of coarse Ca oxides is 500/100 $mm^2$ or more, the service life of a tool will be 0.70 or more and excellent machinability will be exhibited. On the other hand, in the aforementioned duplex stainless steel pipe, if the number density of coarse Ca oxides is less than 500/100 $mm^2$, the service life of a tool will be less than 0.70 and excellent machinability will not be exhibited. That is, it was revealed that in the duplex stainless steel pipe having the aforementioned chemical composition and the aforementioned microstructure, if the number density of coarse Ca oxides is made 500/100 $mm^2$ or more, both a yield strength of 552 MPa or more and excellent machinability can be compatibly obtained.

As described above, the duplex stainless steel pipe according to the present embodiment has the aforementioned chemical composition and has the microstructure consisting of, in volume ratio, ferrite in an amount of 30 to 80% with the balance being austenite, and the number density of the Ca oxides having an equivalent circular diameter of 2.0 μm or more in the duplex stainless steel pipe is 500/100 $mm^2$ or more. As a result, in the duplex stainless steel pipe according to the present embodiment, a yield strength of 552 MPa or more and excellent machinability can both be compatibly obtained.

The gist of the duplex stainless steel pipe according to the present embodiment, which has been completed based on the above findings, is as follows.

[1]

A duplex stainless steel pipe consisting of, by mass %,
C: 0.030% or less,
Si: 1.00% or less,
Mn: 0.10 to 7.00%,
P: 0.040% or less,
S: 0.0050% or less,
Cr: 20.0 to 30.0%,
Ni: 4.2 to 10.0%,
Mo: 0.5 to 5.0%,
Cu: 0.5 to 6.0%,
N: less than 0.350%,
O: 0.0005 to 0.0100%,
Ca: 0.0005 to 0.0100%,
V: 0 to 0.200%,
Nb: 0 to 0.100%,
Al: 0 to 0.100%,
Ta: 0 to 0.100%,
Ti: 0 to 0.100%,
Zr: 0 to 0.100%,
H: 0 to 0.100%,
W: 0 to 0.200%,
Co: 0 to 0.500%,
Sn: 0 to 0.100%,
Sb: 0 to 0.100%,
B: 0 to 0.100%,
Mg: 0 to 0.1000%, and
rare earth metal: 0 to 0.100%,
with the balance being Fe and impurities,
wherein:
a microstructure consists of, in volume ratio, ferrite in an amount of 30 to 80% with the balance being austenite,
a yield strength is 552 MPa or more, and
a number density of Ca oxides having an equivalent circular diameter of 2.0 μm or more is 500/100 $mm^2$ or more.

[2]

The duplex stainless steel pipe according to [1], containing one or more elements selected from a group consisting of:
V: 0.001 to 0.200%,
Nb: 0.001 to 0.100%,
Al: 0.001 to 0.100%,
Ta: 0.001 to 0.100%,
Ti: 0.001 to 0.100%,
Zr: 0.001 to 0.100%,
Hf: 0.001 to 0.100%,
W: 0.001 to 0.200%,
Co: 0.001 to 0.500%,
Sn: 0.001 to 0.100%,
Sb: 0.001 to 0.100%,
B: 0.001 to 0.100%,
Mg: 0.0001 to 0.1000%, and
rare earth metal: 0.001 to 0.100%.

[3]

The duplex stainless steel pipe according to [1] or [2], further containing:
Cu: 1.3 to 6.0%,
wherein a number density of Cu precipitates having a major axis of 50 nm or less is 400/$\mu m^3$ or more.

[4]

The duplex stainless steel pipe according to any one of [1] to [3], containing one or more elements selected from a group consisting of:
V: 0.001 to 0.200%,
Nb: 0.001 to 0.100%,
Al: 0.001 to 0.100%,
Ta: 0.001 to 0.100%,
Ti: 0.001 to 0.100%,
Zr: 0.001 to 0.100%,
Hf: 0.001 to 0.100%, and
W: 0.001 to 0.200%.

[5]

The duplex stainless steel pipe according to any one of [1] to [4], containing one or more elements selected from a group consisting of:
Co: 0.001 to 0.500%,
Sn: 0.001 to 0.100%, and
Sb: 0.001 to 0.100%.

[6]

The duplex stainless steel pipe according to any one of [1] to [5], containing one or more elements selected from a group consisting of:
B: 0.001 to 0.100%,
Mg: 0.0001 to 0.1000%, and
rare earth metal: 0.001 to 0.100%.

The duplex stainless steel pipe according to the present embodiment is described in detail below. Note that, the symbol "%" relating to an element means "mass percent" unless otherwise noted.

[Chemical Composition]

The chemical composition of the duplex stainless steel pipe according to the present embodiment contains the following elements.

C: 0.030% or Less

Carbon (C) is unavoidably contained. That is, the lower limit of the content of C is more than 0%. C forms Cr carbides at grain boundaries and increases the corrosion susceptibility at the grain boundaries. Therefore, if the content of C is too high, the corrosion resistance of the steel material will decrease even if the contents of other elements are within the range of the present embodiment. Therefore, the content of C is to be 0.030% or less. A preferable upper limit of the content of C is 0.028%, and more preferably is 0.025%. The content of C is preferably as low as possible. However, extremely reducing the content of C will significantly increase the production cost. Therefore, when industrial manufacturing is taken into consideration, a preferable lower limit of the content of C is 0.001%, and more preferably is 0.002%.

Si: 1.00% or Less

Silicon (Si) is unavoidably contained. That is, a lower limit of the content of Si is more than 0%. Si deoxidizes the steel. If the content of Si is too low, the aforementioned advantageous effect will not be sufficiently obtained even if the contents of other elements are within the range of the present embodiment. On the other hand, if the content of Si is too high, the toughness and hot workability of the steel material will decrease even if the contents of other elements are within the range of the present embodiment. Therefore, the content of Si is to be 1.00% or less. A preferable lower limit of the content of Si is 0.12%, and more preferably is 0.15%. A preferable upper limit of the content of Si is 0.90%, and more preferably is 0.80%.

Mn: 0.10 to 7.00%

Manganese (Mn) deoxidizes the steel and desulfurizes the steel. Furthermore, Mn enhances the hot workability of the steel material. If the content of Mn is too low, the aforementioned advantageous effects will not be sufficiently obtained even if the contents of other elements are within the range of the present embodiment. On the other hand, if the content of Mn is too high, Mn will segregate to grain boundaries together with impurities such as P and S. In such a case, the corrosion resistance of the steel material will decrease even if the contents of other elements are within the range of the present embodiment. Therefore, the content of Mn is to be 0.10 to 7.00%. A preferable lower limit of the content of Mn is 0.30%, more preferably is 0.50%, further preferably is 0.70%, further preferably is 0.90%, further preferably is 1.00%, further preferably is 1.30%, further preferably is 1.55%, and further preferably is 1.60%. A preferable upper limit of the content of Mn is 6.50%, and more preferably is 6.20%.

P: 0.040% or Less

Phosphorus (P) is an impurity which is unavoidably contained. That is, a lower limit of the content of P is more than 0%. If the content of P is too high, even if the contents of other elements are within the range of the present embodiment, P will segregate to grain boundaries and the toughness of the steel material will decrease. Therefore, the content of P is to be 0.040% or less. A preferable upper limit of the content of P is 0.035%, and more preferably is 0.030%. The content of P is preferably as low as possible. However, extremely reducing the content of P will significantly increase the production cost. Therefore, when industrial manufacturing is taken into consideration, a preferable lower limit of the content of P is 0.001%, and more preferably is 0.003%.

S: 0.0050% or Less

Sulfur (S) is an impurity which is unavoidably contained. That is, a lower limit of the content of S is more than 0%. If the content of S is too high, even if the contents of other elements are within the range of the present embodiment, S will segregate to grain boundaries and the toughness and hot workability of the steel material will decrease. Therefore, the content of S is to be 0.0050% or less. A preferable upper limit of the content of S is 0.0040%, and more preferably is 0.0030%. The content of S is preferably as low as possible. However, extremely reducing the content of S will significantly increase the production cost. Therefore, when industrial manufacturing is taken into consideration, a preferable lower limit of the content of S is 0.0001%, and more preferably is 0.0002%.

Cr: 20.0 to 30.0%

Chromium (Cr) enhances the corrosion resistance of the steel material. Cr also increases the volume ratio of ferrite in the steel material. If the content of Cr is too low, even if the contents of other elements are within the range of the present embodiment, in some cases the volume ratio of austenite will be too high and austenite grains will coarsen. In such a case, the machinability of the steel material will decrease. On the other hand, if the content of Cr is too high, the volume ratio of ferrite will be too high even if the contents of other elements are within the range of the present embodiment. Therefore, the content of Cr is to be 20.0 to 30.0%. A preferable lower limit of the content of Cr is 21.0%, more preferably is 21.5%, and further preferably is 22.0%. A preferable upper limit of the content of Cr is 29.0%, more preferably is 28.0%, and further preferably is 27.0%.

Ni: 4.2 to 10.0%

Nickel (Ni) is an element that stabilizes austenite in the steel material. That is, Ni is an element which is necessary for obtaining a stable duplex microstructure consisting of ferrite and austenite. Ni also enhances the corrosion resistance of the steel material. If the content of Ni is too low, the aforementioned advantageous effects will not be sufficiently obtained even if the contents of other elements are within the range of the present embodiment. In addition, if the content of Ni is too low, the volume ratio of ferrite will be too high. On the other hand, if the content of Ni is too high, even if the contents of other elements are within the range of the present embodiment, in some cases the volume ratio of austenite will be too high and austenite grains will coarsen. In such a case, the machinability of the steel material will decrease. Therefore, the content of Ni is to be 4.2 to 10.0%. A preferable lower limit of the content of Ni is 4.3%, more preferably is 4.5%, and further preferably is 5.0%. A preferable upper limit of the content of Ni is 9.0%, more preferably is 8.5%, further preferably is 8.0%, and further preferably is 7.5%.

Mo: 0.5 to 5.0%

Molybdenum (Mo) enhances the corrosion resistance of the steel material. If the content of Mo is too low, the aforementioned advantageous effect will not be sufficiently obtained even if the contents of other elements are within the range of the present embodiment. On the other hand, if the content of Mo is too high, the hot workability of the steel material will decrease even if the contents of other elements are within the range of the present embodiment. Therefore, the content of Mo is to be 0.5 to 5.0%. A preferable lower limit of the content of Mo is 1.0%, more preferably is 1.2%, and further preferably is 1.5%. A preferable upper limit of the content of Mo is 4.8%, more preferably is 4.6%, and further preferably is 4.3%.

Cu: 0.5 to 6.0%

Copper (Cu) enhances the corrosion resistance of the steel material. If the content of Cu is too low, the aforementioned advantageous effect will not be sufficiently obtained even if the contents of other elements are within the range of the present embodiment. On the other hand, if the content of Cu is too high, the hot workability of the steel material will decrease even if the contents of other elements are within the range of the present embodiment. Therefore, the content of Cu is to be 0.5 to 6.0%. Cu also precipitates in the steel material and thereby enhances the machinability of the steel material. A preferable lower limit of the content of Cu for obtaining the aforementioned advantageous effects is 1.3%, more preferably is 1.5%, further preferably is 1.7%, and further preferably is 2.0%. A preferable upper limit of the content of Cu is 5.5%, more preferably is 5.0%, and further preferably is 4.0%.

N: Less than 0.350%

Nitrogen (N) is unavoidably contained. That is, the lower limit of the content of N is more than 0%. N is an element that stabilizes austenite in the steel material. N also enhances the corrosion resistance of the steel material. On the other hand, if the content of N is too high, the toughness and hot workability of the steel material will decrease even if the contents of other elements are within the range of the present embodiment. Therefore, the content of N is to be less than 0.350%. A preferable upper limit of the content of N is 0.330%, and more preferably is 0.300%. Extremely reducing the content of N will significantly increase the production cost. Therefore, when industrial manufacturing is taken into consideration, a preferable lower limit of the content of N is 0.001%, more preferably is 0.005%, and further preferably is 0.010%.

O: 0.0005 to 0.0100%

Oxygen (O) is an impurity that is unavoidably contained. O combines with Ca to form Ca oxides, and thereby enhances the machinability of the steel material. If the content of O is too low, the aforementioned advantageous effect will not be sufficiently obtained even if the contents of other elements are within the range of the present embodiment. On the other hand, if the content of O is too high, even if the contents of other elements are within the range of the present embodiment, oxides will be excessively formed in the steel material. In such a case, the toughness of the steel material will decrease. Therefore, the content of O is to be 0.0005 to 0.0100%. A preferable lower limit of the content of O is 0.0010%, and more preferably is 0.0015%. A preferable upper limit of the content of O is 0.0090%, and more preferably is 0.0080%.

Ca: 0.0005 to 0.0100%

Calcium (Ca) combines with O in the steel material to form Ca oxides, and thereby enhances the machinability of the steel material. If the content of Ca is too low, the aforementioned advantageous effect will not be sufficiently obtained even if the contents of other elements are within the range of the present embodiment. On the other hand, if the content of Ca is too high, oxides in the steel material will excessively coarsen even if the contents of other elements are within the range of the present embodiment. If a large number of coarse Ca oxides are formed, in some cases the toughness of the steel material may decrease. Therefore, the content of Ca is to be 0.0005 to 0.0100%. A preferable lower limit of the content of Ca is 0.0010%, and more preferably is 0.0020%. A preferable upper limit of the content of Ca is 0.0090%, and more preferably is 0.0080%.

The balance of the chemical composition of the duplex stainless steel pipe according to the present embodiment is Fe and impurities. Here, the phrase "impurities in the chemical composition" means those elements and the like which are mixed in from ore and scrap as the raw material or from the production environment or the like when industrially producing the duplex stainless steel pipe, and which are permitted within a range that does not adversely affect the duplex stainless steel pipe according to the present embodiment.

[Optional Elements]

[First Group of Optional Elements]

The chemical composition of the duplex stainless steel pipe described above may further contain one or more elements selected from the group consisting of V, Nb, Al, Ta, Ti, Zr, Hf, and W in lieu of a part of Fe. Each of these elements increases the strength of the steel material.

V: 0 to 0.200%

Vanadium (V) is an optional element, and does not have to be contained. That is, the content of V may be 0%. When contained, V forms carbo-nitrides and increases the strength of the steel material. If even a small amount of V is contained, the aforementioned advantageous effect will be obtained to a certain extent. However, if the content of V is too high, even if the contents of other elements are within the range of the present embodiment, the strength of the steel material will be too high, and the toughness of the steel material will decrease. Therefore, the content of V is to be 0 to 0.200%. A preferable lower limit of the content of V is more than 0%, more preferably is 0.001%, further preferably is 0.003%, and further preferably is 0.005%. A preferable upper limit of the content of V is 0.180%, and more preferably is 0.160%.

Nb: 0 to 0.100%

Niobium (Nb) is an optional element, and does not have to be contained. That is, the content of Nb may be 0%. When contained, Nb forms carbo-nitrides, and increases the strength of the steel material. If even a small amount of Nb is contained, the aforementioned advantageous effect will be obtained to a certain extent. However, if the content of Nb is too high, even if the contents of other elements are within the range of the present embodiment, the strength of the steel material will be too high, and the toughness of the steel material will decrease. Therefore, the content of Nb is to be 0 to 0.100%. A preferable lower limit of the content of Nb is more than 0%, more preferably is 0.001%, and further preferably is 0.002%. A preferable upper limit of the content of Nb is 0.080%, and more preferably is 0.070%.

Al: 0 to 0.100%

Aluminum (Al) is an optional element, and does not have to be contained. That is, the content of Al may be 0%. When contained, Al forms nitrides, and thereby increases the strength of the steel material. If even a small amount of Al is contained, the aforementioned advantageous effect will be obtained to a certain extent. However, if the content of Al is too high, even if the contents of other elements are within the range of the present embodiment, coarse $Al_2O_3$-based inclusions will form. The coarse $Al_2O_3$-based inclusions will reduce the toughness of the steel material. Therefore, the content of Al is to be 0 to 0.100%. A preferable lower limit of the content of Al is more than 0%, more preferably is 0.001%, further preferably is 0.005%, and further preferably is 0.010%. A preferable upper limit of the content of Al is 0.090%, and more preferably is 0.085%. Note that, the content of Al referred to in the present description means the content of "acid-soluble Al," that is, the content of sol. Al.

Ta: 0 to 0.100%

Tantalum (Ta) is an optional element, and does not have to be contained. That is, the content of Ta may be 0%. When contained, Ta forms carbo-nitrides, and thereby increases the strength of the steel material. If even a small amount of Ta is contained, the aforementioned advantageous effect will be obtained to a certain extent. However, if the content of Ta is too high, even if the contents of other elements are within the range of the present embodiment, the strength of the steel material will be too high, and the toughness of the steel material will decrease. Therefore, the content of Ta is to be 0 to 0.100%. A preferable lower limit of the content of Ta is more than 0%, more preferably is 0.001%, and further preferably is 0.002%. A preferable upper limit of the content of Ta is 0.095%, and more preferably is 0.090%.

Ti: 0 to 0.100%

Titanium (Ti) is an optional element, and does not have to be contained. That is, the content of Ti may be 0%. When contained, Ti forms carbo-nitrides, and thereby increases the strength of the steel material. If even a small amount of Ti is contained, the aforementioned advantageous effect will be obtained to a certain extent. However, if the content of Ti is too high, even if the contents of other elements are within the range of the present embodiment, the strength of the steel material will be too high, and the toughness of the steel material will decrease. Therefore, the content of Ti is to be 0 to 0.100%. A preferable lower limit of the content of Ti is more than 0%, more preferably is 0.001%, and further preferably is 0.002%. A preferable upper limit of the content of Ti is 0.080%, and more preferably is 0.070%.

Zr: 0 to 0.100%

Zirconium (Zr) is an optional element, and does not have to be contained. That is, the content of Zr may be 0%. When contained, Zr forms carbo-nitrides, and thereby increases the strength of the steel material. If even a small amount of Zr is contained, the aforementioned advantageous effect will be obtained to a certain extent. However, if the content of Zr is too high, even if the contents of other elements are within the range of the present embodiment, the strength of the steel material will be too high, and the toughness of the steel material will decrease. Therefore, the content of Zr is to be 0 to 0.100%. A preferable lower limit of the content of Zr is more than 0%, more preferably is 0.001%, and further preferably is 0.002%. A preferable upper limit of the content of Zr is 0.090%, and more preferably is 0.080%.

Hf: 0 to 0.100%

Hafnium (Hf) is an optional element, and does not have to be contained. That is, the content of Hf may be 0%. When contained, Hf forms carbo-nitrides, and thereby increases the strength of the steel material. If even a small amount of Hf is contained, the aforementioned advantageous effect will be obtained to a certain extent. However, if the content of Hf is too high, even if the contents of other elements are within the range of the present embodiment, the strength of the steel material will be too high, and the toughness of the steel material will decrease. Therefore, the content of Hf is to be 0 to 0.100%. A preferable lower limit of the content of Hf is more than 0%, more preferably is 0.001%, and further preferably is 0.002%. A preferable upper limit of the content of Hf is 0.080%, and more preferably is 0.070%.

W: 0 to 0.200%

Tungsten (W) is an optional element, and does not have to be contained. That is, the content of W may be 0%. When contained, W dissolves in the steel and increases the strength of the steel material. If even a small amount of W is contained, the aforementioned advantageous effect will be obtained to a certain extent. However, if the content of W is too high, even if the contents of other elements are within the range of the present embodiment, the strength of the steel material will be too high, and the toughness of the steel material will decrease. Therefore, the content of W is to be 0 to 0.200%. A preferable lower limit of the content of W is more than 0%, more preferably is 0.001%, further preferably is 0.002%, further preferably is 0.003%, and further preferably is 0.005%. A preferable upper limit of the content of W is 0.190%, more preferably is 0.180%, and further preferably is 0.150%.

[Second Group of Optional Elements]

The chemical composition of the duplex stainless steel pipe described above may further contain one or more elements selected from the group consisting of Co, Sn, and Sb in lieu of a part of Fe. Each of these elements enhances the corrosion resistance of the steel material.

Co: 0 to 0.500%

Cobalt (Co) is an optional element, and does not have to be contained. That is, the content of Co may be 0%. When contained, Co forms a coating on the surface of the steel material, and thereby enhances the corrosion resistance of the steel material. Co also increases the hardenability of the steel material and stabilizes the strength of the steel material. If even a small amount of Co is contained, the aforementioned advantageous effects will be obtained to a certain extent. However, if the content of Co is too high, the production cost will increase extremely even if the contents of other elements are within the range of the present embodiment. Therefore, the content of Co is to be 0 to 0.500%. A preferable lower limit of the content of Co is more than 0%, more preferably is 0.001%, further preferably is 0.005%, and further preferably is 0.010%. A preferable upper limit of the content of Co is 0.450%, more preferably is 0.430%, and further preferably is 0.400%.

Sn: 0 to 0.100%

Tin (Sn) is an optional element, and does not have to be contained. That is, the content of Sn may be 0%. When contained, Sn enhances the corrosion resistance of the steel material. If even a small amount of Sn is contained, the aforementioned advantageous effect will be obtained to a certain extent. However, if the content of Sn is too high, the production cost will increase extremely even if the contents of other elements are within the range of the present embodiment. Therefore, the content of Sn is to be 0 to 0.100%. A preferable lower limit of the content of Sn is more than 0%, more preferably is 0.001%, further preferably is 0.002%, and further preferably is 0.003%. A preferable upper limit of the content of Sn is 0.090%, and more preferably is 0.080%.

Sb: 0 to 0.100%

Antimony (Sb) is an optional element, and does not have to be contained. That is, the content of Sb may be 0%. When contained, Sb enhances the corrosion resistance of the steel material. If even a small amount of Sb is contained, the aforementioned advantageous effect will be obtained to a certain extent. However, if the content of Sb is too high, the production cost will increase extremely even if the contents of other elements are within the range of the present embodiment. Therefore, the content of Sb is to be 0 to 0.100%. A preferable lower limit of the content of Sb is more than 0%, more preferably is 0.001%, further preferably is 0.002%, and further preferably is 0.003%. A preferable upper limit of the content of Sb is 0.080%, and more preferably is 0.070%.

[Third Group of Optional Elements]

The chemical composition of the duplex stainless steel pipe described above may further contain one or more elements selected from the group consisting of B, Mg, and rare earth metal (REM) in lieu of a part of Fe. Each of these elements fixes S in the steel material as a sulfide, and enhances the hot workability of the steel material.

B: 0 to 0.100%

Boron (B) is an optional element, and does not have to be contained. That is, the content of B may be 0%. When contained, B suppresses segregation of S in the steel material to grain boundaries and enhances the hot workability of the steel material. If even a small amount of B is contained, the aforementioned advantageous effect will be obtained to a certain extent. However, if the content of B is too high, even if the contents of other elements are within the range of the present embodiment, boron nitride (BN) will be formed and will cause the toughness of the steel material to decrease. Therefore, the content of B is to be 0 to 0.100%. A preferable lower limit of the content of B is more than 0%, more preferably is 0.001%, further preferably is 0.002%, and further preferably is 0.003%. A preferable upper limit of the content of B is 0.095%, more preferably is 0.090%, and further preferably is 0.080%.

Mg: 0 to 0.1000%

Magnesium (Mg) is an optional element, and does not have to be contained. That is, the content of Mg may be 0%. When contained, Mg fixes S in the steel material as a sulfide to make it harmless, and thereby enhances the hot workability of the steel material. If even a small amount of Mg is contained, the aforementioned advantageous effect will be obtained to a certain extent. However, if the content of Mg is too high, oxides in the steel material will coarsen even if the contents of other elements are within the range of the present embodiment. The coarse oxides will reduce the toughness of the steel material. Therefore, the content of Mg is to be 0 to 0.1000%. A preferable lower limit of the content of Mg for more effectively obtaining the aforementioned advantageous effect is more than 0%, more preferably is 0.0001%, further preferably is 0.0005%, and further preferably is 0.0010%. A preferable upper limit of the content of Mg is 0.0900%, more preferably is 0.0800%, and further preferably is 0.0500%.

Rare Earth Metal: 0 to 0.100%

Rare earth metal (REM) is an optional element, and does not have to be contained. That is, the content of REM may be 0%. When contained, REM fixes S in the steel material as a sulfide to make it harmless. As a result, the hot workability of the steel material is enhanced. If even a small amount of REM is contained, the aforementioned advantageous effect will be obtained to a certain extent. However, if the content of REM is too high, oxides in the steel material will coarsen even if the contents of other elements are within the range of the present embodiment. The coarse oxides will reduce the toughness of the steel material. Therefore, the content of REM is to be 0 to 0.100%. A preferable lower limit of the content of REM is more than 0%, more preferably is 0.001%, further preferably is 0.005%, and further preferably is 0.010%. A preferable upper limit of the content of REM is 0.090%, more preferably is 0.080%, and further preferably is 0.060%.

Note that, in the present description the term "REM" means one or more elements selected from the group consisting of scandium (Sc) which is the element with atomic number 21, yttrium (Y) which is the element with atomic number 39, and the elements from lanthanum (La) with atomic number 57 to lutetium (Lu) with atomic number 71 that are lanthanoids. In the present description the term "content of REM" refers to the total content of these elements.

[Microstructure]

The microstructure of the duplex stainless steel pipe according to the present embodiment consists of, in volume ratio, ferrite in an amount of 30 to 80% with the balance being austenite. In the present description, the phrase that the microstructure "consists of ferrite and austenite" means that the amount of any phase other than ferrite and austenite in the microstructure is negligibly small. For example, in the microstructure of the duplex stainless steel pipe according to the present embodiment, volume ratios of precipitates and inclusions are negligibly low as compared with the volume ratios of ferrite and austenite.

If the volume ratio of ferrite is too low, in some cases the austenite may coarsen. In such a case, the machinability of the duplex stainless steel pipe will decrease. On the other hand, if the volume ratio of ferrite is too high, in some cases the desired mechanical properties will not be obtained in the duplex stainless steel pipe. Therefore, in the microstructure of the duplex stainless steel pipe according to the present embodiment, the volume ratio of ferrite is to be 30 to 80%. A preferable lower limit of the volume ratio of ferrite is 32%, and more preferably is 35%. A preferable upper limit of the volume ratio of ferrite is 75%, and more preferably is 70%.

In the present embodiment, the volume ratio of ferrite in the duplex stainless steel pipe can be determined by a method in accordance with ASTM E562 (2019). A test specimen having an observation surface with dimensions of 5 mm in a pipe axis direction and 5 mm in a pipe diameter direction is prepared from a center portion of a wall thickness of the duplex stainless steel pipe according to the present embodiment. Note that, a size of the test specimen is not particularly limited as long as the aforementioned observation surface can be obtained. The observation surface of the prepared test specimen is mirror-polished. The mirror-polished observation surface is electrolytically etched in a 7% potassium hydroxide etching solution to reveal the microstructure. The observation surface on which the microstructure has been revealed is observed in 10 visual fields using an optical microscope. An area of each visual field is not particularly limited, and, for example, is 0.25 $mm^3$ (magnification of 400×). In each visual field, ferrite is identified based on contrast. An area fraction of the identified ferrite is measured by a point counting method in accordance with ASTM E562 (2019). In the present embodiment, an arithmetic average value of the area fractions of ferrite obtained in the 10 visual fields is defined as the volume ratio (%) of ferrite. In the present embodiment, a value obtained by rounding off decimals of the obtained value is adopted as the volume ratio (%) of ferrite.

[Yield Strength]

The duplex stainless steel pipe according to the present embodiment has a yield strength of 552 MPa or more. The duplex stainless steel pipe according to the present embodiment has the chemical composition described above, and the microstructure consisting of, in volume ratio, ferrite in an amount of 30 to 80% with the balance being austenite, and furthermore, a number density of Ca oxides having an equivalent circular diameter of 2.0 μm or more in the duplex stainless steel pipe is 500/100 $mm^2$ or more. As a result, even though the yield strength is 552 MPa or more, the duplex stainless steel pipe according to the present embodiment has excellent machinability. A preferable lower limit of the yield strength of the duplex stainless steel pipe according to the present embodiment is 566 MPa, more preferably is 579 MPa, and further preferably is 586 MPa. Although not particularly limited, the upper limit of the yield strength of the duplex stainless steel pipe according to the present embodiment is, for example, 862 MPa.

The yield strength of the duplex stainless steel pipe according to the present embodiment can be determined by the following method. A tensile test specimen is prepared from the duplex stainless steel pipe according to the present embodiment in accordance with ASTM E8/E8M (2021). Specifically, a round bar specimen is prepared from the center portion of the wall thickness of the steel pipe. A size of the round bar test specimen is, for example, as follows: a parallel portion diameter is 8.9 mm and a gage length is 35.6 mm. In a case where a round bar specimen cannot be prepared from the steel pipe, an arc-shaped test specimen is to be prepared. A size of the arc-shaped test specimen is, for example, as follows: A thickness is a full wall thickness, a width is 25.4 mm, and a gage length is 50.8 mm. Note that, an axial direction of the tensile test specimen is parallel to a rolling (pipe axis) direction of the steel pipe. A tensile test is carried out at normal temperature (24±3° C.) in accordance with ASTM E8/E8M (2021) using the tensile test specimen, and an obtained 0.2% offset yield stress (MPa) is defined as the yield strength (MPa). In the present embodiment, a value obtained by rounding off decimals of the obtained numerical value is adopted as the yield strength (MPa).

[Ca Oxides]

In the duplex stainless steel pipe according to the present embodiment, the number density of Ca oxides having an equivalent circular diameter of 2.0 μm or more is 500/100 $mm^2$ or more. In the present description, the term "Ca oxides" is defined as those particles in which the content of O is 50% by mass or more when the total content of O, N, and S among the elements contained in the respective particles contained in the duplex stainless steel pipe is taken as 100% by mass, and in which the content of Ca is 50% by mass or more when the total content of elements excluding O, N, and S among the elements contained in the respective particles is taken as 100% by mass. Further, in the present description, Ca oxides having an equivalent circular diameter of 2.0 μm or more are also referred to as "coarse Ca oxides".

As mentioned above, in a duplex stainless steel pipe whose strength has been increased, the machinability is liable to decrease. Therefore, in the duplex stainless steel pipe which has the aforementioned chemical composition and the aforementioned microstructure, and in which the yield strength has been increased to 552 MPa or more, the machinability is liable to decrease and tool wear during cutting work is liable to increase. Therefore, the duplex stainless steel pipe according to the present embodiment contains coarse Ca oxides with the number density of 500/100 $mm^2$ or more. As a result, the duplex stainless steel pipe according to the present embodiment has excellent machinability while also maintaining the yield strength of 552 MPa or more.

In the duplex stainless steel pipe according to the present embodiment, a preferable lower limit of the number density of coarse Ca oxides is 600/100 $mm^2$, more preferably is 700/100 $mm^2$, and further preferably is 800/100 $mm^2$. In the duplex stainless steel pipe according to the present embodiment, although not particularly limited, the upper limit of the number density of coarse Ca oxides is, for example, 3000/100 $mm^2$.

The number density of coarse Ca oxides in the duplex stainless steel pipe according to the present embodiment can be determined by the following method. Specifically, a test specimen is prepared from the center portion of the wall thickness of the duplex stainless steel pipe. The prepared test specimen is embedded in resin in a manner so that a face of the test specimen which includes the rolling (pipe axis) direction and the wall thickness (pipe diameter) direction is the observation surface. The observation surface of the test specimen that is embedded in resin is then polished. An arbitrary 10 visual fields on the observation surface after polishing are observed. An area of each visual field is set to, for example, 100 $mm^2$ (10 mm×10 mm).

In each visual field, the number of Ca oxides having an equivalent circular diameter of 2.0 μm or more is determined. Specifically, first, particles in each visual field are identified based on contrast. Each identified particle is subjected to an element concentration analysis (EDS analysis). In the EDS analysis, an accelerating voltage is set to 20 kV, and element concentrations are determined for O, N, S, Ca, Mg, Al, Si, P, Ti, Cr, Mn, Fe, Cu, Zr, and Nb as elements to be analyzed. Based on an EDS analysis result for each particle, those particles in which the content of O is 50% by mass or more when the total content of O, N, and S is taken as 100% by mass, and in which the content of Ca is 50% by mass or more when the total content of Ca, Mg, Al, Si, P, Ti, Cr, Mn, Fe, Cu, Zr, and Nb is taken as 100% by mass are identified as "Ca oxides".

Ca oxides that have an equivalent circular diameter of 2.0 μm or more (coarse Ca oxides) are identified among the Ca oxides which were identified in the 10 visual fields, and the total number of the coarse Ca oxides is determined. Note that, the equivalent circular diameter of a Ca oxide can be determined by a well-known method. The number density of the coarse Ca oxides (/100 $mm^2$) is determined based on the total number of the coarse Ca oxides and the total area of the 10 visual fields. In the present embodiment, a value obtained by rounding off decimals of the obtained numerical value is adopted as the number density of coarse Ca oxides (/100 mm). Note that, measurement of the number density of coarse Ca oxides can be performed using an apparatus in which a scanning electron microscope is provided with a composition analysis function (SEM-EDS apparatus). For example, automated inclusion analysis equipment having the trade name "Metals Quality Analyzer" manufactured by FEI Company (ASPEX Corporation) can be used as the SEM-EDS apparatus.

[Cu Precipitates]

Preferably, in the duplex stainless steel pipe according to the present embodiment, the content of Cu is 1.3% or more, and the number density of Cu precipitates having a major axis of 50 nm or less is 400/$\mu m^3$ or more. In the present description, the term "Cu precipitates" means precipitates composed of Cu and impurities.

In the present description, Cu precipitates having a major axis of 50 nm or less are also referred to as "fine Cu precipitates". As mentioned above, the duplex stainless steel pipe according to the present embodiment contains coarse Ca oxides with the number density of 500/100 $mm^2$ or more, which enhances the machinability of the steel pipe. In the duplex stainless steel pipe according to the present embodiment, when, in addition, the number density of fine Cu precipitates is 400/$\mu m^3$ or more, the duplex stainless steel pipe according to the present embodiment has further excellent machinability.

Therefore, the duplex stainless steel pipe according to the present embodiment has the aforementioned chemical composition and the aforementioned microstructure, contains coarse Ca oxides with the number density of 500/100 $mm^2$ or more, and in addition, preferably the content of Cu in the chemical composition is made 1.3% or more and the number density of fine Cu precipitates is made 400/$\mu m^3$ or more. In the duplex stainless steel pipe according to the present embodiment, a more preferable lower limit of the number density of fine Cu precipitates is 450/$\mu m^3$, and further preferably is 500/$\mu m^3$. In the duplex stainless steel pipe according to the present embodiment, although not particularly limited, the upper limit of the number density of fine Cu precipitates is, for example, 3000/$\mu m^3$, and preferably is 2000/$\mu m^3$.

In the duplex stainless steel pipe according to the present embodiment, the number density of fine Cu precipitates can be determined by the following method. A thin film test specimen for observation of fine Cu precipitates is prepared from the duplex stainless steel pipe according to the present embodiment. Specifically, the thin film test specimen is prepared from the center portion of the wall thickness of the steel pipe. Note that, the thin film test specimen is prepared by electropolishing using a twin-jet method. Further, a size of the thin film test specimen is not particularly limited as long as an observation visual field to be described later can be obtained.

On the observation surface of the obtained thin film test specimen, an arbitrary four visual fields are specified from the austenite phase. The austenite phase in the observation surface can be identified by identification of the crystal structure by electron diffraction. The specified four visual fields are subjected to microstructure observation using a transmission electron microscope (hereinafter, also referred to as a "TEM"). Specifically, the arbitrary four visual fields are specified as observation visual fields. Although not particularly limited, an area of each observation visual field is set to, for example, 800 nm×800 nm. The microstructure observation for each observation visual field is conducted using an accelerating voltage of 200 kV and a diffraction condition that is set to a condition suitable for observation of precipitates. The phrase "a diffraction condition that is set to a condition suitable for observation of precipitates" refers to, for example, a diffraction vector g=11−1 at 011 incidence. In addition, precipitates are photographed by performing exposure for an appropriate time. In the generated photographic images, precipitates are identified based on contrast. Among the identified precipitates, precipitates having a major axis of 50 nm or less are identified by performing a comparison with a scale bar in the images. Note that, identification of precipitates having a major axis of 50 nm or less in the observation visual fields is, as a matter of course, possible for a person skilled in the art to perform. Note that, in the present description, the major axis is identified as a length of the longest line segment among line segments linking arbitrary two points on an outer circumference of the relevant precipitate in the aforementioned images.

The precipitates having a major axis of 50 nm or less identified in the manner described above are subjected to elementary analysis by EDS. Note that, element concentrations are determined for Fe, Cr, Ni, Cu, Mn, Mo, and Si as elements to be analyzed. Here, in the EDS, due to the characteristics of the apparatus, elementary analysis is performed with respect to a range that has a certain volume. That is, even when precipitates are present at the observation surface, elementary analysis of only the precipitates cannot be performed, and base metal is also simultaneously subjected to elementary analysis. Accordingly, when elementary analysis by EDS is performed in a region in which Cu precipitates are present at the observation surface, elements (Fe and the like) derived from the base metal are also simultaneously detected in addition to Cu.

On the other hand, in the present embodiment the content of Cu in the base metal is, as mentioned above, 0.5 to 6.0%. Therefore, in elementary analysis by EDS, if a precipitate has a Cu concentration of 15.0% by mass or more, it can be determined that the precipitate is a Cu precipitate. In each observation visual field, the number of precipitates which have a major axis of 50 nm or less and which are precipitates having a Cu concentration of 15.0% by mass or more (fine Cu precipitates) is counted. In addition, the volume ($\mu m^3$) of each observation region is determined based on the area of each observation visual field and a thickness of the observation region. Note that, the thickness of the observation region can be determined based on, with respect to the thin film test specimen, a total integrated intensity of an electron energy loss spectrum (EELS) and an integrated intensity of a zero-loss spectrum.

The number density of fine Cu precipitates ($/\mu m^3$) in each observation visual field is determined based on the obtained number (pieces) of Cu precipitates having a major axis of 50 nm or less in each observation visual field and the volume ($\mu m^3$) of each observation visual field. An arithmetic average value of the number densities of fine Cu precipitates obtained in the four visual fields is defined as the number density of fine Cu precipitates ($/\mu m^3$). In the present embodiment, a value obtained by rounding off decimals of the obtained numerical value is adopted as the number density of fine Cu precipitates ($/\mu m^3$).

[Machinability]

The duplex stainless steel pipe according to the present embodiment has the chemical composition described above and has the microstructure consisting of, in volume ratio, ferrite in an amount of 30 to 80% with the balance being austenite, and the number density of coarse Ca oxides in the duplex stainless steel pipe is 500/100 $mm^2$ or more. As a result, the duplex stainless steel pipe according to the present embodiment has excellent machinability even when the yield strength is 552 MPa or more. In the present embodiment, the machinability can be evaluated by the following method.

The duplex stainless steel pipe according to the present embodiment is subjected to outer circumferential lathe turning to evaluate the service life of a tool. Specifically, a hard metal equivalent to P10 defined in JIS B 4053 (2013) is used as a cutting tool. A cutting speed is set to 100 m/min, a feed rate is set to 0.15 mm/rev, a cut depth is set to 0.75 mm, and the outer circumferential lathe turning is performed without using a lubricant.

Of the entire surface of the steel pipe, a face subjected to outer circumferential lathe turning is also referred to as a finished surface of the steel pipe. In the present embodiment, focusing on the fact that a quality of the finished surface of the steel pipe decreases when the tool reaches an end of its service life, the service life of a tool is evaluated using the quality of the finished surface of the steel pipe as an index. Specifically, outer circumferential lathe turning is performed while checking the finished surface of the steel pipe by visual observation. A maximum height Rz is measured with respect to a region where a decrease in the quality of the finished surface of the steel pipe was confirmed as a result of checking the quality by visual observation. Specifically, the maximum height Rz is measured using a surface roughness tester in accordance with JIS B 0601 (2013). When measuring the maximum height Rz, a sampling length is set to 2.5 mm, and an evaluation length is set to 12.5 mm.

If the obtained maximum height Rz is more than 30 μm, the outer circumferential lathe turning is ended. If the obtained maximum height Rz is 30 μm or less, performance of the outer circumferential lathe turning is continued. In the present embodiment, a distance for which the outer circumferential lathe turning is performed from the time that the outer circumferential lathe turning is started using a new tool until the maximum height Rz of the finished surface of the steel pipe becomes more than 30 μm is defined as the service life of a tool.

Note that, when performing outer circumferential lathe turning, flaws that are caused by inclusions typified by Ca sulfides may sometimes be formed on the finished surface of the steel pipe. A person skilled in the art can identify by visual observation that flaws formed on the finished surface of a steel pipe were caused by inclusions. In the present embodiment, flaws caused by inclusions are ignored in the evaluation of the quality of the finished surface of the steel pipe. That is, in the case of measuring the maximum height Rz also, the maximum height Rz is measured in a region in which flaws caused by inclusions are not formed.

In addition, for a steel pipe equivalent to API 5CT L80, specifically, a steel pipe containing C: 0.20 to 0.30%, Si: 1.0% or less, Mn: 2.0% or less, P: 0.03% or less, S: 0.03% or less, Cr: 1.5% or less, and Mo: 1.0% or less, the service life of a tool obtained when the steel pipe is subjected to the same outer circumferential lathe turning is taken as 1.00, and a relative value of the service life of a tool is then determined. In the present embodiment, a value obtained by rounding off to second decimal places of the obtained numerical value is adopted as the service life of a tool (relative value). For the duplex stainless steel pipe according to the present embodiment, if the service life of a tool (relative value) determined by the above method is 0.70 or more, the duplex stainless steel pipe is evaluated as having excellent machinability.

The duplex stainless steel pipe according to the present embodiment has the chemical composition described above and has the microstructure consisting of, in volume ratio, ferrite in an amount of 30 to 80% with the balance being austenite, the number density of coarse Ca oxides in the duplex stainless steel pipe is 500/100 $mm^2$ or more, and in addition, preferably the content of Cu is 1.3% or more and the number density of fine Cu precipitates is 400/$\mu m^3$ or more. In such a case, the duplex stainless steel pipe has further excellent machinability even though the yield strength is 552 MPa or more. Here, in the present embodiment, if the service life of a tool (relative value) determined by the aforementioned method is 0.80 or more, the duplex stainless steel pipe is evaluated as having further excellent machinability.

[Shape and Uses]

The duplex stainless steel pipe according to the present embodiment may be a seamless steel pipe or may be a welded steel pipe. The steel pipe is, for example, an oil-well steel pipe. The term "oil-well steel pipe" means a steel pipe that is to be used in oil country tubular goods. Oil country tubular goods are, for example, casing pipes, tubing pipes, and drilling pipes which are used for drilling an oil well or a gas well, extracting crude oil or natural gas, and the like. Preferably, the duplex stainless steel pipe according to the present embodiment is a seamless steel pipe for oil wells.

As described above, the duplex stainless steel pipe according to the present embodiment has the aforementioned chemical composition and has the microstructure consisting of, in volume ratio, ferrite in an amount of 30 to 80% with the balance being austenite, and the number density of coarse Ca oxides in the duplex stainless steel pipe is 500/100 $mm^2$ or more. As a result, the duplex stainless steel pipe according to the present embodiment has a yield strength of 552 MPa or more and excellent machinability.

[Production Method]

An example of a method for producing the duplex stainless steel pipe according to the present embodiment constituted as described above will now be described. The production method described hereunder is a method for producing a seamless steel pipe, as one example of a method for producing the duplex stainless steel pipe. Note that, as mentioned above, the duplex stainless steel pipe according to the present embodiment is not limited to a seamless steel pipe, and may be a welded steel pipe. However, the production method described hereunder is a preferred production method in a case where the duplex stainless steel pipe according to the present embodiment is a seamless steel pipe. In other words, a method for producing the duplex stainless steel pipe according to the present embodiment is not limited to the production method described hereunder.

One example of the method for producing the duplex stainless steel pipe according to the present embodiment includes a process of preparing a starting material (steelmaking process), a process of subjecting the starting material to hot working to produce a hollow shell (hot working process), and a process of performing a solution treatment (solution treatment process). Each of these production processes is described in detail hereunder.

[Steelmaking Process]

The steelmaking process includes a process of producing molten steel (refining process), and a process of producing a starting material by a casting process using the molten steel (starting material production process).

[Refining Process]

In the refining process, first, a molten steel containing Cr is placed in a ladle, and the molten steel in the ladle is subjected to a decarburization treatment under atmospheric pressure. This process is referred to as a "rough decarburization refining process". Slag is generated by the decarburization treatment in the rough decarburization refining process. The slag generated by the decarburization treatment floats on a liquid surface of the molten steel after the rough decarburization refining process. In the rough decarburization refining process, Cr in the molten steel is oxidized to form $Cr_2O_3$. The $Cr_2O_3$ is absorbed into the slag. Therefore, a deoxidizer is added to the ladle to reduce $Cr_2O_3$ in the slag and recover Cr in the molten steel. This process is referred to as a "Cr reduction treatment process". The rough decarburization refining process and the Cr reduction treatment process are carried out, for example, by an electric furnace process, a converter process, or an AOD (Argon Oxygen Decarburization) process. After the Cr reduction treatment process, the slag is removed from the molten steel. This process is referred to as a "slag removal treatment process".

In a case of a Cr-containing steel, because C activity is reduced by the Cr, a decarburization reaction is suppressed. Therefore, the molten steel after the slag removal treatment process is further subjected to a finishing decarburization treatment. This process is referred to as a "finishing decarburization refining process". In the finishing decarburization refining process, a decarburization treatment is performed under reduced pressure. If the decarburization treatment is performed under reduced pressure, the CO gas partial pressure ($P_{CO}$) in the atmosphere is lowered, and oxidation of Cr in the molten steel is suppressed. Therefore, if the decarburization treatment is performed under reduced pressure, the C concentration in the molten steel can be further lowered while suppressing oxidation of Cr. After the finishing decarburization refining process, a deoxidizer is added to the molten steel, and the Cr reduction treatment for reducing $Cr_2O_3$ in the slag is performed again. This process is referred to as the "Cr reduction treatment process". The finishing decarburization refining process and the Cr reduction treatment process after the finishing decarburization refining process may be performed, for example, by the VOD (Vacuum Oxygen Decarburization) process or may be performed by the RH (Ruhrstahl-Heraeus) process.

After the Cr reduction treatment process, final compositional adjustment for the molten steel in the ladle, and temperature adjustment of the molten steel before the starting material production process are performed. This process is referred to as a "compositional adjustment process". The compositional adjustment process is performed, for example, by LT (Ladle Treatment). Ca is added to the molten steel in a latter half of the compositional adjustment process. Here, a time from when Ca is added to the molten steel until the Ca is uniformly dispersed in the molten steel is defined as a "uniform mixing time" τ. The uniform mixing time r can be determined by the following Formula (A).

$$\tau = 800 \times \varepsilon^{-0.4} \quad \text{(A)}$$

Where, ε represents a stirring power density of the molten steel in the LT, and is defined by Formula (B).

$$\varepsilon = 28.5(Q/W) \times T \times \log(1 + H/1.48) \quad \text{(B)}$$

Where, Q represents a flow rate of top-blown gas ($Nm^3$/min), W represents a molten steel mass (t), T represents a molten steel temperature (K), and H represents a depth of molten steel in the ladle (molten steel depth) (m).

In the compositional adjustment process, the molten steel temperature in the ladle is maintained at 1500 to 1700° C. Further, a holding time after elapse of the uniform mixing time after Ca is added to the molten steel is defined as a "holding time t" (sec). In this case, in the present embodiment, the holding time t after elapse of the uniform mixing time is set to 100 to 1000 seconds.

If the holding time t is too short, in some cases Ca oxides will finely disperse in the molten steel. In such a case, coarse Ca oxides having an equivalent circular diameter of 2.0 μm or more cannot be sufficiently obtained. On the other hand, if the holding time t is too long, in some cases the inclusions will float too much in the molten steel. In such a case, the number density of coarse Ca oxides will decrease. Accordingly, in the compositional adjustment process of the present embodiment, preferably the holding time t is set to 100 to 1000 seconds.

[Starting Material Production Process]

A starting material is produced using the molten steel produced by the above-described refining process. The term "starting material" refers to a cast piece or an ingot. Specifically, a cast piece is produced by a continuous casting process using the molten steel. The cast piece may be a slab, may be a bloom, or may be a billet. Alternatively, an ingot may be produced by an ingot-making process using the molten steel. The cast piece or ingot may be further subjected to blooming or the like to produce a billet. A starting material is produced by the above-described process.

[Hot Working Process]

In the hot working process, the prepared starting material is subjected to hot working to produce a hollow shell. First, the starting material is heated in a reheating furnace. Although not particularly limited, a heating temperature is, for example, 1000 to 1300° C. After the starting material is extracted from the reheating furnace, the starting material is subjected to hot working. In the present embodiment, the hot working is not particularly limited. For example, the hot working may be hot rolling or may be hot extrusion. In the case of performing hot rolling as the hot working, for example, the Mannesmann process may be performed to produce a hollow shell. In the case of performing the Mannesmann process, the starting material (a round billet) is subjected to piercing-rolling using a piercing machine. When performing piercing-rolling, although not particularly limited, for example, a piercing ratio is 1.0 to 4.0. The hollow round billet subjected to piercing-rolling is further subjected to hot rolling with a mandrel mill, a reducer, a sizing mill, or the like to produce a hollow shell.

In the case of performing hot extrusion as the hot working, for example, the Ugine-Sejournet process or the Ehrhardt push bench process may be performed to produce a hollow shell. Note that, hot working may be performed only one time or may be performed multiple times. For example, after performing the aforementioned piercing-rolling on the starting material, the aforementioned hot extrusion may be performed. For example, in addition, after performing the aforementioned piercing-rolling on the starting material, drawing and rolling may be performed. That is, in the hot working process, hot working is performed by a well-known method to produce a hollow shell.

[Solution Treatment Process]

In the solution treatment process, the hollow shell produced by the aforementioned hot working process is subjected to a solution treatment. A method for performing the solution treatment is not particularly limited, and it suffices to perform a well-known method. For example, the hollow shell is charged into a heat treatment furnace, and after being held at a desired temperature, is rapidly cooled. Note that, in the case of performing a solution treatment by charging the hollow shell into a heat treatment furnace, holding the hollow shell at a desired temperature, and thereafter rapidly cooling the hollow shell, the term "solution treatment temperature" means a temperature (° C.) of the heat treatment furnace for performing the solution treatment. In this case, in addition, the term "solution treatment time" means a time for which the hollow shell is held at the solution treatment temperature.

Preferably, the solution treatment temperature in the solution treatment process of the present embodiment is set to 900 to 1100° C. If the solution treatment temperature is too low, precipitates (for example, a σ phase that is an intermetallic compound or the like) may sometimes remain in the hollow shell after the solution treatment. In such a case, the corrosion resistance of the produced duplex stainless steel pipe will decrease. In addition, if the solution treatment temperature is too low, in some cases the ferrite volume ratio in the hollow shell after the solution treatment will be too low. In such a case, austenite will coarsen and the machinability of the produced duplex stainless steel pipe will decrease. On the other hand, if the solution treatment temperature is too high, in some cases the ferrite volume ratio in the hollow shell after the solution treatment will be too high. In such a case, it may not be possible to obtain the desired mechanical properties in the produced duplex stainless steel pipe.

When performing a solution treatment by charging the hollow shell into a heat treatment furnace, holding the hollow shell at a desired temperature, and thereafter performing rapid cooling, the solution treatment time is not particularly limited, and it suffices that it is in accordance with a well-known condition. The solution treatment time is, for example, 5 to 180 minutes. The rapid cooling method is, for example, water-cooling.

[Other Processes]

The production method according to the present embodiment may include production processes other than the production processes described above. In the present embodiment, preferably, after undergoing the solution treatment process, the hollow shell is subjected to an aging heat treatment. The term "aging heat treatment" means a treatment in which the hollow shell after the solution treatment is held at a desired temperature. In the case of performing an aging heat treatment, a preferable heat treatment temperature is 340 to 660° C., and a preferable holding time is 20 to 80 minutes. Note that, in the present description, the term "heat treatment temperature" means a temperature of the heat treatment furnace for performing the aging heat treatment. Further, in the present description, the term "holding time" means a time period for which the hollow shell is held at the heat treatment temperature.

In a case where an aging heat treatment for which the heat treatment temperature is 340 to 660° C. and the holding time is 20 to 80 minutes is performed on a hollow shell in which the content of Cu is 1.3% or more subjected to the solution treatment process, fine Cu precipitates disperse and precipitate in the microstructure of the hollow shell. As a result, in the duplex stainless steel pipe that is produced, the number density of fine Cu precipitates will be 400/$\mu m^3$ or more, and the machinability of the steel pipe will be further enhanced. On the other hand, if the heat treatment temperature in the aging heat treatment is too high, in some cases Cu precipitates will coarsen. If the heat treatment temperature in the aging heat treatment is too low, fine Cu precipitates will not sufficiently precipitate. Further, if the holding time in the aging heat treatment is too short, fine Cu precipitates will not sufficiently precipitate. If the holding time in the aging heat treatment is too long, the effect of the aging heat treatment will be saturated.

In the case of performing the aging heat treatment, a more preferable lower limit of the heat treatment temperature is 350° C., and further preferably is 380° C. In the case of performing the aging heat treatment, a more preferable upper limit of the heat treatment temperature is 650° C., and further preferably is 630° C. In the case of performing the aging heat treatment, a more preferable lower limit of the holding time is 25 minutes, and further preferably is 30 minutes. In the case of performing the aging heat treatment, a more preferable upper limit of the holding time is 70 minutes, and further preferably is 60 minutes.

A pickling treatment may be performed after the solution treatment process. In this case, the pickling treatment is not particularly limited, and it suffices that the pickling treatment is performed by a well-known method. When a pickling treatment is performed, a passive film is formed on the surface of the produced duplex stainless steel pipe, and thus the corrosion resistance of the duplex stainless steel pipe is further enhanced.

The duplex stainless steel pipe according to the present embodiment can be produced by the process described above. Note that, as mentioned above, a method for producing the duplex stainless steel pipe according to the present embodiment is not limited to the production method described above. Specifically, as long as the duplex stainless steel pipe which has the aforementioned chemical composition and has the microstructure consisting of, in volume ratio, ferrite in an amount of 30 to 80% with the balance being austenite, and in which the number density of coarse Ca oxides is 500/100 $mm^2$ or more can be produced, a method for producing the duplex stainless steel pipe according to the present embodiment is not limited to the production method described above. Hereunder, the duplex stainless steel pipe according to the present embodiment is described more specifically by way of examples.

EXAMPLES

Molten steels having the chemical compositions shown in Table 1 were produced. Note that, the symbol "-" in Table 1 means that the content of the corresponding element was at an impurity level. For example, it means that the content of V, the content of Nb, the content of Al, the content of B, the content of Ta, the content of Ti, the content of Zr, the content of Hf, the content of W, the content of REM, the content of Co, the content of Sn, and the content of Sb of Test No. 1 were each 0% when rounded off to third decimal places. For example, in addition, it means that the content of Mg of Test No. 1 was 0% when rounded off to fourth decimal places.

TABLE 1

| Steel | Chemical Composition (unit is mass %; balance is Fe and impurities) | | | | | | | | | | | | |
|---|---|---|---|---|---|---|---|---|---|---|---|---|---|
| Symbol | C | Si | Mn | P | S | Cr | Ni | Mo | Cu | N | O | Ca | V | Nb |
| A | 0.008 | 0.58 | 1.30 | 0.030 | 0.0006 | 24.8 | 5.5 | 1.6 | 2.4 | 0.210 | 0.0038 | 0.0043 | — | — |
| B | 0.029 | 0.49 | 5.30 | 0.022 | 0.0009 | 20.5 | 5.9 | 00 | 2.9 | 0.065 | 0.0048 | 0.0060 | 0.088 | — |
| C | 0.009 | 0.57 | 3.90 | 0.030 | 0.0004 | 21.9 | 6.3 | 3.6 | 2.5 | 0.094 | 0.0043 | 0.0049 | — | 0.016 |
| D | 0.002 | 0.60 | 3.00 | 0.014 | 0.0005 | 21.0 | 16.2 | 3.0 | 3.4 | 0.149 | 0.0068 | 0.0040 | — | — |
| E | 0.015 | 0.25 | 1.30 | 0.008 | 0.0003 | 23.1 | 15.9 | 1.8 | 1.7 | 0.216 | 0.0034 | 0.0030 | — | — |
| F | 0.014 | 0.67 | 1.00 | 0.004 | 0.0010 | 23.6 | 7.1 | 3.8 | 3.8 | 0.082 | 0.0039 | 0.0062 | — | — |
| G | 0.016 | 0.42 | 2.00 | 0.014 | 0.0010 | 24.7 | 4.4 | 2.2 | 1.5 | 0.171 | 0.0079 | 0.0065 | — | — |
| H | 0.003 | 0.64 | 5.30 | 0.010 | 0.0010 | 22.0 | 7.2 | 1.5 | 2.1 | 0.030 | 0.0045 | 0.0066 | — | — |
| I | 0.016 | 0.55 | 3.70 | 0.010 | 0.0002 | 20.1 | 15.8 | 2.3 | 2.0 | 0.270 | 0.0033 | 0.0020 | — | — |
| J | 0.021 | 0.15 | 6.00 | 0.022 | 0.0008 | 22.1 | 16.0 | 2.8 | 2.6 | 0.051 | 0.0067 | 0.0066 | — | — |
| K | 0.007 | 0.68 | 0.70 | 0.018 | 0.0004 | 22.0 | 4.6 | 1.4 | 1.6 | 0.268 | 0.0036 | 0.0067 | — | — |
| L | 0.003 | 0.39 | 5.40 | 0.018 | 0.0006 | 25.5 | 7.3 | 0.9 | 4.0 | 0.276 | 0.0037 | 0.0059 | — | — |
| M | 0.025 | 0.69 | 5.90 | 0.008 | 0.0002 | 22.8 | 7.3 | 2.2 | 2.3 | 0.280 | 0.0055 | 0.0031 | 0.094 | 0.059 |
| N | 0.004 | 0.55 | 3.40 | 0.011 | 0.0006 | 24.0 | 4.9 | 3.9 | 3.8 | 0.120 | 0.0055 | 0.0063 | — | — |
| O | 0.016 | 0.69 | 1.80 | 0.030 | 0.0005 | 25.9 | 5.0 | 1.3 | 1.7 | 0.061 | 0.0067 | 0.0044 | — | — |
| P | 0.005 | 0.30 | 1.70 | 0.029 | 0.0003 | 23.7 | 6.8 | 3.6 | 1.8 | 0.312 | 0.0022 | 0.0024 | — | — |
| Q | 0.024 | 0.31 | 4.00 | 0.027 | 0.0004 | 25.8 | 16.2 | 2.5 | 2.0 | 0.268 | 0.0059 | 0.0070 | — | — |
| R | 0.023 | 0.50 | 2.10 | 0.005 | 0.0009 | 25.2 | 16.4 | 0.9 | 3.8 | 0.089 | 0.0035 | 0.0056 | — | — |
| S | 0.025 | 0.31 | 4.40 | 0.028 | 0.0002 | 26.8 | 7.5 | 12.9 | 3.5 | 0.271 | 0.0015 | 0.0019 | — | — |
| T | 0.022 | 0.85 | 0.20 | 0.022 | 0.0030 | 29.1 | 8.9 | 4.5 | 5.5 | 0.270 | 0.0055 | 0.0056 | 0.012 | — |
| U | 0.007 | 0.23 | 5.50 | 0.008 | 0.0003 | 21.9 | 16.8 | 1.2 | 1.0 | 0.037 | 0.0025 | 0.0034 | — | — |
| V | 0.004 | 0.12 | 4.30 | 0.006 | 0.0007 | 19.5 | 9.5 | 2.4 | 1.5 | 0.203 | 0.0042 | 0.0060 | — | — |
| W | 0.004 | 0.16 | 3.90 | 0.004 | 0.0003 | 22.4 | 7.5 | 1.8 | 2.2 | 0.120 | 0.0031 | 0.0003 | — | — |

| Steel | Chemical Composition (unit is mass %; balance is Fe and impurities) | | | | | | | | | | | |
|---|---|---|---|---|---|---|---|---|---|---|---|---|
| Symbol | Al | Ta | Ti | Zr | Hf | W | Co | Sn | Sb | B | Mg | REM |
| A | — | — | — | — | — | — | — | — | — | — | — | — |
| B | — | — | — | — | — | — | — | — | — | — | — | — |
| C | — | — | — | — | — | — | — | — | — | — | — | — |
| D | 0.039 | — | — | — | — | — | — | — | — | — | — | — |
| E | — | — | — | — | — | — | — | — | — | 0.078 | — | — |
| F | — | 0.084 | — | — | — | — | — | — | — | — | — | — |
| G | — | — | 0.017 | — | — | — | — | — | — | — | — | — |
| H | — | — | — | 0.090 | — | — | — | — | — | — | — | — |
| I | — | — | — | — | 0.057 | — | — | — | — | — | — | — |
| J | — | — | — | — | — | 0.025 | — | — | — | — | — | — |
| K | 0.064 | — | — | — | — | — | — | — | — | 0.036 | — | — |

TABLE 1-continued

| | | | | | | | | | | | | |
|---|---|---|---|---|---|---|---|---|---|---|---|---|
| L | — | — | — | — | — | — | — | — | — | — | — | — |
| M | — | — | 0.075 | — | — | — | — | — | — | — | — | — |
| N | 0.027 | — | — | — | — | — | — | — | — | — | — | 0.038 |
| O | — | — | — | — | — | — | 0.369 | — | — | 0.090 | — | — |
| P | — | 0.096 | — | — | — | — | — | 0.006 | — | — | — | — |
| Q | — | — | 0.009 | — | — | — | — | — | 0.021 | — | — | — |
| R | — | — | — | 0.069 | — | — | — | — | — | — | 0.0360 | — |
| S | — | — | 0.051 | — | — | — | 0.363 | 0.096 | — | — | — | — |
| T | — | — | — | — | — | 0.160 | — | — | — | — | — | — |
| U | — | — | — | — | — | — | — | — | — | — | — | — |
| V | — | — | — | — | — | — | — | — | — | — | — | — |
| W | — | — | — | — | — | — | — | — | — | — | — | — |

The molten steel of each test number was produced as follows. The molten steel containing Cr was placed in a ladle and a well-known rough decarburization refining process and Cr reduction treatment process were performed by the AOD process. After the Cr reduction treatment process, a slag removal treatment process in which slag was removed from the molten steel was performed. In addition, a well-known finishing decarburization refining process and Cr reduction treatment process were performed by the VOD process.

After the Cr reduction treatment process was performed by the VOD process, the molten steel in the ladle was subjected to final compositional adjustment by LT and the temperature of the molten steel was adjusted before the starting material production process. For each test number, the molten steel temperature was in a range of 1500 to 1700° C. In addition, Ca was added to the molten steel. After Ca was added, the holding time t (sec) after elapse of the uniform mixing time was adjusted as shown in Table 2. The molten steels having the chemical compositions shown in Table 1 were produced by the above processes.

TABLE 2

| | | | | Solution Treatment | | Aging Heat Treatment |
|---|---|---|---|---|---|---|
| Test Number | Steel Symbol | Refining Holding Time t (sec) | Hot Working Heating Temperature (° C.) | Solution Treatment Temperature (° C.) | Solution Treatment Time (min) | Heat Treatment Temperature (° C.) |
| 1 | A | 660 | 1265 | 1050 | 10 | — |
| 2 | A | 660 | 1265 | 1050 | 10 | 500 |
| 3 | B | 940 | 1270 | 1050 | 10 | 500 |
| 4 | C | 180 | 1275 | 1050 | 10 | 500 |
| 5 | D | 180 | 1285 | 1050 | 10 | 500 |
| 6 | E | 320 | 1290 | 1050 | 10 | 500 |
| 7 | F | 780 | 1295 | 1050 | 10 | 500 |
| 8 | G | 940 | 1285 | 1070 | 10 | 500 |
| 9 | H | 860 | 1285 | 1070 | 20 | 500 |
| 10 | I | 570 | 1285 | 1070 | 40 | 500 |
| 11 | J | 530 | 1285 | 1070 | 80 | 500 |
| 12 | K | 450 | 1285 | 1070 | 160 | 500 |
| 13 | L | 600 | 1285 | 980 | 20 | 350 |
| 14 | M | 250 | 1285 | 980 | 20 | 400 |
| 15 | N | 500 | 1285 | 980 | 20 | 450 |
| 16 | O | 140 | 1285 | 980 | 20 | 500 |
| 17 | P | 690 | 1285 | 980 | 20 | 550 |
| 18 | Q | 130 | 1285 | 980 | 20 | 600 |
| 19 | R | 490 | 1285 | 980 | 20 | 650 |
| 20 | S | 970 | 1285 | 980 | 20 | 500 |
| 21 | T | 660 | 1270 | 1050 | 10 | 500 |
| 22 | U | 760 | 1285 | 980 | 20 | 500 |
| 23 | E | 500 | 1290 | 1070 | 10 | — |
| 24 | V | 450 | 1285 | 980 | 20 | 500 |
| 25 | W | 240 | 1285 | 980 | 20 | 500 |
| 26 | A | 60 | 1265 | 1050 | 10 | 500 |
| 27 | A | 1200 | 1265 | 1050 | 10 | 500 |

TABLE 2-continued

| Test Number | Aging Heat Treatment Holding Time (min) | YS (MPa) | Ferrite (%) | Coarse Ca Oxides (/100 mm$^2$) | Fine Cu Precipitates (/μm$^3$) | Service Life of Tool (relative value) |
|---|---|---|---|---|---|---|
| 1 | — | 557 | 50 | 1145 | 110 | 0.71 |
| 2 | 30 | 629 | 51 | 990 | 960 | 0.90 |
| 3 | 30 | 709 | 35 | 690 | 1110 | 0.82 |
| 4 | 20 | 608 | 46 | 782 | 600 | 0.86 |
| 5 | 40 | 681 | 43 | 698 | 1110 | 0.90 |
| 6 | 30 | 596 | 40 | 823 | 1010 | 0.81 |
| 7 | 30 | 745 | 45 | 890 | 1260 | 0.89 |
| 8 | 20 | 755 | 60 | 530 | 1210 | 0.87 |
| 9 | 20 | 589 | 35 | 756 | 1140 | 0.93 |
| 10 | 40 | 609 | 38 | 1369 | 1150 | 1.06 |
| 11 | 40 | 573 | 33 | 1472 | 800 | 1.06 |
| 12 | 80 | 652 | 70 | 1080 | 1300 | 0.91 |
| 13 | 30 | 732 | 39 | 1576 | 470 | 1.00 |
| 14 | 30 | 657 | 34 | 818 | 640 | 0.96 |
| 15 | 30 | 693 | 63 | 1710 | 890 | 1.08 |
| 16 | 30 | 589 | 60 | 560 | 1050 | 0.85 |
| 17 | 30 | 591 | 55 | 926 | 1100 | 0.92 |
| 18 | 30 | 637 | 57 | 530 | 1340 | 0.91 |
| 19 | 30 | 634 | 47 | 1257 | 1460 | 1.03 |
| 20 | 30 | 651 | 50 | 843 | 860 | 0.88 |
| 21 | 30 | 703 | 63 | 1010 | 1070 | 0.84 |
| 22 | 30 | 563 | 38 | 900 | 20 | 0.73 |
| 23 | — | 559 | 41 | 1070 | 0 | 0.75 |
| 24 | 30 | 707 | 25 | 850 | 990 | 0.67 |
| 25 | 30 | 747 | 43 | 78 | 600 | 0.63 |
| 26 | 30 | 610 | 51 | 320 | 900 | 0.61 |
| 27 | 30 | 607 | 50 | 430 | 860 | 0.63 |

The molten steel of each steel symbol was melted using a 50 kg vacuum furnace, and ingots of the respective test numbers were produced by an ingot-making process. Each obtained ingot was heated by a heating temperature (° C.) of hot working shown in Table 2, and thereafter subjected to hot rolling to produce a hollow shell (seamless steel pipe) having an outer diameter of 177.8 mm and a wall thickness of 12.65 mm.

The hollow shell of each test number on which the hot working had been performed was then subjected to a solution treatment performed at a solution treatment temperature (° C.) and for a solution treatment time (min) which are shown in Table 2. The hollow shell of each test number on which the solution treatment had been performed was then subjected to an aging heat treatment performed at a heat treatment temperature (° C.) and for a holding time (min) which are shown in Table 2. Further, the symbol "-" in the columns "Heat Treatment Temperature" and "Holding Time" in Table 2 means that the aging heat treatment was not performed.

A seamless steel pipe of each test number was obtained by the process described above. The obtained seamless steel pipe of each test number was subjected to a tensile test, a microstructure observation test, a coarse Ca oxides number density measurement test, a fine Cu precipitates number density measurement test, and a machinability evaluation test.

[Tensile Test]

The seamless steel pipe of each test number was subjected to the tensile test in accordance with ASTM E8/E8M (2021). Specifically, a round bar tensile test specimen was prepared from a center portion of a wall thickness of the seamless steel pipe of each test number. Each round bar tensile test specimen had a parallel portion diameter of 8.9 mm, and a parallel portion length of 35.6 mm. A longitudinal direction of the round bar tensile test specimen was parallel to a rolling direction (pipe axis direction) of the seamless steel pipe. A tensile test was carried out at normal temperature (25° C.) in atmospheric air using the round bar tensile test specimen of each test number, and a 0.2% offset yield stress (MPa) was determined. The determined 0.2% offset yield stress was defined as a yield strength (MPa). The obtained yield strength of each test number is shown in the column "YS (MPa)" in Table 2.

[Microstructure Observation Test]

The seamless steel pipe of each test number was subjected to the microstructure observation test, and a volume ratio of ferrite was determined. For the seamless steel pipe of each test number, the volume ratio (%) of ferrite was determined by the aforementioned point counting method in accordance with ASTM E562 (2019). The determined volume ratio (%) of ferrite for each test number is shown in the column "Ferrite (%)" in Table 2.

[Coarse Ca Oxides Number Density Measurement Test]

The seamless steel pipe of each test number was subjected to the coarse Ca oxides number density measurement test, and a number density of Ca oxides having an equivalent circular diameter of 2.0 μm or more (coarse Ca oxides) was determined. The number density of coarse Ca oxides was determined by the method described above using a test specimen prepared from a center portion of the wall thickness of the seamless steel pipe of each test number. The determined number density of coarse Ca oxides (/100 mm$^2$) of each test number is shown in the column "Coarse Ca Oxides (/100 mm$^2$)" in Table 2.

[Fine Cu Precipitates Number Density Measurement Test]

The seamless steel pipe of each test number was subjected to the fine Cu precipitates number density measurement test, and a number density of Cu precipitates having a major axis of 50 nm or less (fine Cu precipitates) was determined. The number density of fine Cu precipitates was determined by the method described above using a test specimen prepared from a center portion of the wall thickness of the seamless steel pipe of each test number. The determined number density of fine Cu precipitates (/μm$^3$) of each test number is shown in the column "Fine Cu Precipitates (/μm$^3$)" in Table 2.

[Machinability Evaluation Test]

The seamless steel pipe of each test number was subjected to outer circumferential lathe turning by the method described above, and the machinability was evaluated. In the present Examples, service life of a tool was used as an index for evaluating the machinability. Specifically, a hard metal equivalent to P10 defined in JIS B 4053 (2013) was used as a cutting tool. Cutting conditions were set as follows: cutting speed: 100 m/min, feed rate: 0.15 mm/rev, cut depth: 0.75 mm, and lubricant: not used. A quality of a finished surface of the steel pipe of each test number was evaluated, according to the method described above, by visual observation of the finished surface of the steel pipe and based on a maximum height Rz measured using a surface roughness tester in accordance with JIS B 0601 (2013).

As described above, when the maximum height Rz of the finished surface of the steel pipe was more than 30 μm, the outer circumferential lathe turning was ended. In the present Examples, a distance for which outer circumferential lathe turning was performed from a time that the outer circumferential lathe turning was started using a new tool until the maximum height Rz of the finished surface of the steel pipe became more than 30 μm was defined as the service life of a tool for each test number. In addition, the service life of a tool (relative value) was determined by taking the service life of a tool obtained when a steel pipe equivalent to API 5CT L80, specifically, a steel pipe containing C: 0.20 to 0.30%, Si: 1.0% or less, Mn: 2.0% or less, P: 0.03% or less, S: 0.03% or less, Cr: 1.5% or less, and Mo: 1.0% or less was subjected to the same outer circumferential lathe turning as 1.00. The service life of a tool (relative value) obtained for each test number is shown in the column "Service Life of Tool (relative value)" in Table 2.

[Evaluation Results]

Referring to Table 1 and Table 2, for each of the seamless steel pipes of Test Nos. 1 to 23, the chemical composition was appropriate, and the production method also satisfied the conditions of the preferred production method described above. As a result, in these seamless steel pipes the yield strength was 552 MPa or more. Further, in these seamless steel pipes, the volume ratio of ferrite in the microstructure was 30 to 80% by volume. In addition, in these seamless steel pipes, the number density of coarse Ca oxides was 500/100 $mm^2$ or more. As a result, for each of these seamless steel pipes the service life of a tool (relative value) was 0.70 or more, and thus these seamless steel pipes had excellent machinability. That is, each of the seamless steel pipes of Test Nos. 1 to 23 had a yield strength of 552 MPa or more and had excellent machinability.

In addition, in the seamless steel pipes of Test Nos. 2 to 21, the number density of fine Cu precipitates was 400/$\mu m^3$ or more. As a result, for each of these seamless steel pipes the service life of a tool (relative value) was 0.80 or more, and thus these seamless steel pipes had further excellent machinability.

On the other hand, in the seamless steel pipe of Test No. 24, the content of Cr was too low. As a result, the volume ratio of ferrite in this seamless steel pipe was less than 30% by volume. Consequently, for this seamless steel pipe the service life of a tool (relative value) was less than 0.70, and the seamless steel pipe did not have excellent machinability.

In the seamless steel pipe of Test No. 25, the content of Ca was too low. Therefore, the number density of coarse Ca oxides in this seamless steel pipe was less than 500/100 $mm^2$. As a result, for this seamless steel pipe the service life of a tool (relative value) was less than 0.70, and the seamless steel pipe did not have excellent machinability.

For the seamless steel pipe of Test No. 26, the holding time t was too short. Therefore, the number density of coarse Ca oxides in this seamless steel pipe was less than 500/100 $mm^2$. As a result, for this seamless steel pipe the service life of a tool (relative value) was less than 0.70, and the seamless steel pipe did not have excellent machinability.

For the seamless steel pipe of Test No. 27, the holding time t was too long. Therefore, the number density of coarse Ca oxides in this seamless steel pipe was less than 500/100 $mm^2$. As a result, for this seamless steel pipe the service life of a tool (relative value) was less than 0.70, and the seamless steel pipe did not have excellent machinability.

An embodiment of the present disclosure has been described above. However, the embodiment described above is merely an example for carrying out the present disclosure. Therefore, the present disclosure is not limited to the above-described embodiment, and can be implemented by appropriately modifying the above-described embodiment within a range not departing from the spirit thereof.

Note that, the gist of the duplex stainless steel pipe according to the present embodiment can also be described as follows.

[1]

A duplex stainless steel pipe consisting of, by mass %,
C: 0.030% or less,
Si: 1.00% or less,
Mn: 0.10 to 7.00%,
P: 0.040% or less,
S: 0.0050% or less,
Cr: 20.0 to 30.0%,
Ni: 4.2 to 10.0%,
Mo: 0.5 to 5.0%,
Cu: 0.5 to 6.0%,
N: less than 0.350%,
O: 0.0005 to 0.0100%, and
Ca: 0.0005 to 0.0100%,
with the balance being Fe and impurities,
wherein:
a microstructure consists of, in volume ratio, ferrite in an amount of 30 to 80% with the balance being austenite;
a yield strength is 552 MPa or more; and
a number density of Ca oxides having an equivalent circular diameter of 2.0 μm or more is 500/100 $mm^2$ or more.

[2]

A duplex stainless steel pipe containing, by mass %,
C: 0.030% or less,
Si: 1.00% or less,
Mn: 0.10 to 7.00%,
P: 0.040% or less,
S: 0.0050% or less,
Cr: 20.0 to 30.0%,
Ni: 4.2 to 10.0%,
Mo: 0.5 to 5.0%,
Cu: 0.5 to 6.0%,
N: less than 0.350%,
O: 0.0005 to 0.0100%, and
Ca: 0.0005 to 0.0100%,
and further containing one or more elements selected from a group consisting of:
V: 0.200% or less,
Nb: 0.100% or less,
Al: 0.100% or less,
Ta: 0.100% or less,
Ti: 0.100% or less,
Zr: 0.100% or less,
Hf: 0.100% or less, W: 0.200% or less,
Co: 0.500% or less,
Sn: 0.100% or less,
Sb: 0.100% or less,
B: 0.100% or less,
Mg: 0.1000% or less, and
rare earth metal: 0.100% or less,
with the balance being Fe and impurities,
wherein:
a microstructure consists of, in volume ratio, ferrite in an amount of 30 to 80% with the balance being austenite;
a yield strength is 552 MPa or more; and
a number density of Ca oxides having an equivalent circular diameter of 2.0 μm or more is 500/100 $mm^2$ or more.

[3]

The duplex stainless steel pipe according to [2], containing one or more elements selected from a group consisting of:
V: 0.200% or less,
Nb: 0.100% or less,
Al: 0.100% or less,
Ta: 0.100% or less,
Ti: 0.100% or less,
Zr: 0.100% or less,
Hf: 0.100% or less, and
W: 0.200% or less.

[4]

The duplex stainless steel pipe according to [2] or [3], containing one or more elements selected from a group consisting of:
Co: 0.500% or less,
Sn: 0.100% or less, and
Sb: 0.100% or less.

[5]

The duplex stainless steel pipe according to any one of [2] to [4], containing one or more elements selected from a group consisting of:
B: 0.100% or less,
Mg: 0.1000% or less, and
rare earth metal: 0.100% or less.

[6]

The duplex stainless steel pipe according to any one of [1] to [5], containing:
Cu: 1.3 to 6.0%,
wherein a number density of Cu precipitates having a major axis of 50 nm or less is 400/$\mu m^3$ or more.

The invention claimed is:

1. A duplex stainless steel pipe consisting of, by mass %,
C: 0.030% or less,
Si: 1.00% or less,
Mn: 0.10 to 7.00%,
P: 0.040% or less,
S: 0.0050% or less,
Cr: 20.0 to 30.0%,
Ni: 4.2 to 10.0%,
Mo: 0.5 to 5.0%,
Cu: 0.5 to 6.0%,
N: less than 0.350%,
O: 0.0005 to 0.0100%,
Ca: 0.0005 to 0.0100%,
V: 0 to 0.200%,
Nb: 0 to 0.100%,
Al: 0 to 0.100%,
Ta: 0 to 0.100%,
Ti: 0 to 0.100%,
Zr: 0 to 0.100%,
Hf: 0 to 0.100%,
W: 0 to 0.200%,
Co: 0 to 0.500%,
Sn: 0 to 0.100%,
Sb: 0 to 0.100%,
B: 0 to 0.100%,
Mg: 0 to 0.1000%, and
rare earth metal: 0 to 0.100%,
with the balance being Fe and impurities,
wherein:
a microstructure consists of, in volume ratio, ferrite in an amount of 30 to 80% with the balance being austenite;
a yield strength is 552 MPa or more; and
a number density of Ca oxides having an equivalent circular diameter of 2.0 μm or more is 500/100 $mm^2$ or more.

2. The duplex stainless steel pipe according to claim 1, containing one or more elements selected from a group consisting of:
V: 0.001 to 0.200%,
Nb: 0.001 to 0.100%,
Al: 0.001 to 0.100%,
Ta: 0.001 to 0.100%,
Ti: 0.001 to 0.100%,
Zr: 0.001 to 0.100%,
Hf: 0.001 to 0.100%,
W: 0.001 to 0.200%,
Co: 0.001 to 0.500%,
Sn: 0.001 to 0.100%,
Sb: 0.001 to 0.100%,
B: 0.001 to 0.100%,
Mg: 0.0001 to 0.1000%, and
rare earth metal: 0.001 to 0.100%.

3. The duplex stainless steel pipe according to claim 1, containing:
Cu: 1.3 to 6.0%,
wherein a number density of Cu precipitates having a major axis of 50 nm or less is 400/$\mu m^3$ or more.

4. The duplex stainless steel pipe according to claim 2, containing:
Cu: 1.3 to 6.0%,
wherein a number density of Cu precipitates having a major axis of 50 nm or less is 400/$\mu m^3$ or more.

* * * * *